(12) United States Patent
Tortora

(10) Patent No.: US 9,501,038 B2
(45) Date of Patent: Nov. 22, 2016

(54) LUMINOUS DISPLAY HAND FOR A PORTABLE OBJECT SUCH AS A WATCH OR A MEASURING INSTRUMENT

(71) Applicant: The Swatch Group Research and Development Ltd, Marin (CH)

(72) Inventor: Pierpasquale Tortora, Neuchâtel (CH)

(73) Assignee: The Swatch Group Research and Development Ltd, Marin (CH)

( * ) Notice: Subject to any disclaimer, the term of this patent is extended or adjusted under 35 U.S.C. 154(b) by 39 days.

(21) Appl. No.: 14/688,513

(22) Filed: Apr. 16, 2015

(65) Prior Publication Data

US 2015/0346690 A1    Dec. 3, 2015

(30) Foreign Application Priority Data

May 27, 2014   (EP) .................................. 14170036

(51) Int. Cl.
| | |
|---|---|
| *G04B 19/30* | (2006.01) |
| *F21V 33/00* | (2006.01) |
| *F21V 8/00* | (2006.01) |

(52) U.S. Cl.
CPC ......... *G04B 19/305* (2013.01); *F21V 33/0004* (2013.01); *G02B 6/009* (2013.01); *G02B 6/0083* (2013.01)

(58) Field of Classification Search
CPC ............ G04B 19/305; F21V 33/0004; G02B 6/0083; G02B 6/009
USPC ......... 362/23.16, 23.09, 23.12, 23.17, 23.19, 362/23.21
See application file for complete search history.

(56) References Cited

U.S. PATENT DOCUMENTS

| | | | |
|---|---|---|---|
| 2,072,795 A | 3/1937 | Childs | |
| 2,363,763 A | 11/1944 | Werts | |
| 4,215,647 A * | 8/1980 | Fukasawa | G01D 13/22 116/286 |

FOREIGN PATENT DOCUMENTS

| | | | |
|---|---|---|---|
| EP | 2 950 168 | * | 5/2014 |
| FR | 2 393 273 A1 | | 12/1978 |
| GB | 2 004 065 A | | 3/1979 |
| GB | 2 233 478 A | | 1/1991 |
| GB | 2 421 809 A | | 7/2006 |
| JP | 56-7074 A | | 1/1981 |
| JP | 56-7075 A | | 1/1981 |

(Continued)

OTHER PUBLICATIONS

European search report issued in application 14170036, completed Feb. 25, 2015.

(Continued)

*Primary Examiner* — Laura Tso
(74) *Attorney, Agent, or Firm* — Oblon, McClelland, Maier & Neustadt, L.L.P.

(57) ABSTRACT

Luminous display hand for a portable object, the portable object including a frame which houses an electrical energy supply source, the hand including a light guide in which is arranged a hole for the passage of a drive arbor, and a housing for accommodating a light source which injects light into the light guide, the light source including first and second poles, the first pole of the light source being connected to the energy supply source via the drive arbor of the hand and the second pole of the light source being connected to the energy supply source via the frame of the portable object.

8 Claims, 2 Drawing Sheets

(56) References Cited

FOREIGN PATENT DOCUMENTS

| | | |
|---|---|---|
| KR | 10-2011-0048807 A | 5/2011 |
| WO | 97/28424 A1 | 8/1997 |

OTHER PUBLICATIONS

European search report issued in application 14170094, completed Mar. 2, 2015.

* cited by examiner ical energy supply
LUMINOUS DISPLAY HAND FOR A PORTABLE OBJECT SUCH AS A WATCH OR A MEASURING INSTRUMENT This application claims priority from European patent application No. 14170036.9 filed May 27, 2014, the entire disclosure of which is hereby incorporated herein by reference.

FIELD OF THE INVENTION

The present invention concerns a luminous display hand for a portable object. The present invention concerns, in particular, a luminous display hand for a timepiece such as a wristwatch or a measuring apparatus with an analogue display.

BACKGROUND OF THE INVENTION

Watch hands are manufactured with tight tolerances. The hole in the hand for the passage of the pipe is generally made with a precision of around a micrometre. This precision is necessary in order to ensure that the hand is correctly driven onto its arbor. Hands are generally made from a metal sheet with a thickness of no more than a few hundred micrometres. To reduce the thickness of the watch, the distance between the hands and the watch glass are usually no more than a millimetre, whereas the distance which separates two coaxial hands, for example the hour hand and the minute hand, is on the order of a fraction of a millimetre.

Watch hands evidently have a functional role, for example indicating the current time, but they also have a decorative role by greatly contributing to the aesthetic appearance of the watch to which they are fitted. To this end, the hands must meet strict criteria. A well known technique in the world of watchmaking permitting the hands to be seen in the dark consists in coating the surface of the hands oriented towards the user with a layer of phosphorescent material. One example of such a material is a non-radioactive photoluminescent pigment sold by the Japanese company Nemoto & Co. Ltd, under the registered trademark Super-Luminova®. This pigment may also be used to coat the hour symbols on the watch dial. In daytime, the layer of phosphorescent material absorbs light energy. This light energy is then released at night by the layer of phosphorescent material in the form of luminous radiation. This technique of illuminating the hands of a watch is quite convenient insofar as the layer of phosphorescent material operates in a completely passive manner and therefore does not require actuation of any mechanical or electrical device in order to function, nor does it require any energy to be taken from the watch. However, this technique of illuminating the hands of a watch also has some drawbacks, the first of which requiring mention is the fact that the layer of phosphorescent material must be pre-illuminated by a light source before it is able to transmit light energy. Likewise, the phenomenon of retransmitting light by phosphorescence is limited in time, so that the luminosity of the phosphorescent layer decreases gradually as it releases the light energy that it has stored. The appearance of the hands coated with a layer of phosphorescent material is not, therefore, constant. Finally, there is a limited range of phosphorescent materials available on the market, so that most watches in which such materials are used generally have the same appearance in the dark and even in broad daylight.

As a variant of the phosphorescent layer, it is possible to envisage using active illumination techniques in which discrete light sources are used to light the hands of a watch. By way of example, it is possible to integrate an ultraviolet light source in the watch, so that the radiation emitted excites the fluorescent material which coats the hands. However, this type of embodiment also has drawbacks. On the one hand, ultraviolet light sources, also known as black light sources, emit a certain amount of visible light, so that the user is likely to see a halo of light at the place where the light source is placed. On the other hand, given that the hands can move in relation to the ultraviolet light source, they do not always receive the same quantity of ultraviolet light, so that their luminosity may vary.

SUMMARY OF THE INVENTION

It is an object of the present invention to overcome the aforementioned drawbacks in addition to others, by providing a luminous display hand able to be illuminated on demand by the user, in a large variety of colours and observing the dimensional and aesthetic constraints to which it is subjected.

To this end, the present invention concerns a luminous display hand for a portable object, the portable object including a frame which houses an electrical energy supply source, the hand including a light guide in which is arranged a hole for the passage of a drive arbor, and a housing for accommodating a light source which injects light into the light guide, the light source including a first and a second pole, the first pole of the light source being connected to the energy supply source via the drive arbor of the hand, and the second pole of the light source being connected to the energy supply source via the frame of the portable object.

As a result of these features, the present invention provides a luminous display hand for a portable object, for example a watch or a measuring instrument, whose appearance remains constant over time. Further, the range of colours offered by point light sources such as light emitting diodes is very broad. It is therefore possible to personalise the appearance of the hand and thus of the portable object, for example a wristwatch, fitted with the hand, which makes it possible to stand out from the competition. Finally, the point light source is disposed in a housing arranged in the light guide and not in the drive arbor of the hand, which considerably simplifies the design of such a hand.

According to a complementary feature of the invention, the second pole of the light source is connected to the frame of the portable object via an electrically conductive support piece which carries the light source.

According to another feature of the invention, the electrical connection between the support piece and the frame of the portable object occurs by friction.

According to yet another feature of the invention, the light guide includes a first surface portion facing an observer, and a second surface portion, opposite the first surface portion, an electrically conductive external part which electrically connects the light source to the drive arbor being arranged on the first surface portion of the light guide.

According to yet another feature of the invention, the support piece is fixed to the second surface portion of the light guide.

According to yet another feature of the invention, the second pole of the light source is connected to ground.

BRIEF DESCRIPTION OF THE DRAWINGS

Other features and advantages of the present invention will appear more clearly upon reading the following detailed description of one embodiment of the invention, this example being given purely by way of non-limiting illustration with reference to the annexed drawing, in which.

DETAILED DESCRIPTION OF ONE EMBODIMENT OF THE INVENTION

The present invention proceeds from the general inventive idea which consists in illuminating a display hand for a portable object, such as a wristwatch or a measuring instrument, by means of a point light source, preferably a light emitting diode. This luminous display hand has several advantages: its appearance does not deteriorate with the passing of time, and because there is a wide range of existing light emitting diodes, it is possible to personalise the appearance of the hand and therefore the appearance of the portable object to which it is fitted, making it possible to stand out from the competition. Further, according to another advantage of the invention, the light source is housed in the light guide and not, for example, in the drive arbor of the hand, which considerably simplifies the design of such hands as well as the electrical connection thereof to the electrical energy source housed within the frame of the portable object.

Figure 1:
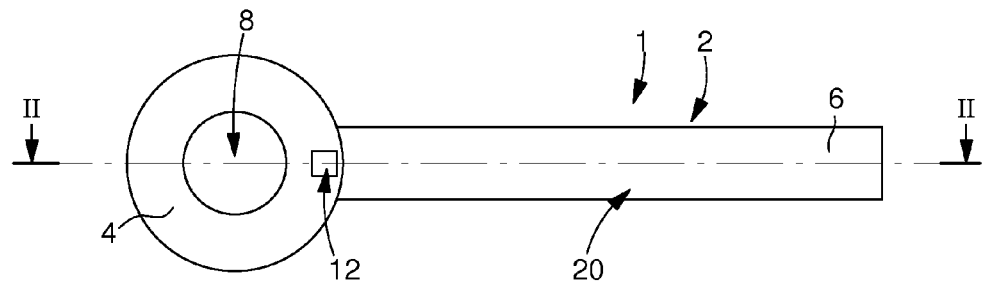
FIG. 1 is a top view of a luminous display hand according to the invention.
Figure 2:
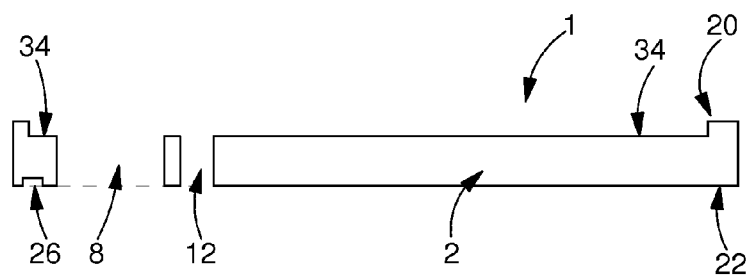
FIG. 2 is a cross-section along the line II-II of FIG. 1 of a luminous display hand according to the invention.

FIGS. 1 and 2 are respectively a top view and a cross-section along the line II-II of FIG. 1 of a luminous display hand 1 according to the invention. Luminous display hand 1 according to the invention includes a light guide designated as a whole by the general reference numeral 2 and which may be made, as desired, of a transparent, semi-transparent or translucent material such as plastic, quartz, silicon, sapphire, ruby or other material. Light guide 2 includes an annular element 4 extended by a substantially rectilinear portion 6. Annular element 4 has, at the centre thereof, a hole 8 for the passage of a drive arbor 10. A housing 12 intended to accommodate a light source 14, such as a light emitting diode, is arranged in annular part 4 of light guide 2, in the area where annular part 4 is extended by rectilinear portion 6. Consequently, light source 14 is capable of injecting light by coupling inside light guide 2, and in particular in rectilinear portion 6 of light guide 2. As explained in more detail below, light source 14 includes (see FIG. 3) first and second poles 14A and 14B for electrical connection to an electrical energy supply source 16 housed inside a frame 18, for example of a wristwatch fitted with the luminous display hand according to the invention. The electrical energy supply source 16 may be either a cell or a rechargeable battery. Given that the light sources in question here typically have an electrical power consumption on the order of several tens to several hundred microamperes, it is even possible to envisage powering said source by means of a watch barrel or a generator or a dynamo actuated by the user, for example by means of a push button, provided in the portable object. The advantage of such a solution lies in the fact that it avoids any energy storage solution relying on physicochemical phenomena. It will also be understood that, even when using light sources whose power consumption is as low as several tens of microamperes, the lighting obtained is already equivalent to that of the phosphorescent materials usually used to coat luminous display hands.

As seen in FIGS. 1 and 2, light guide 2 has a cross-section of square or rectangular shape with a first surface portion 20 facing a user, and a second surface portion 22 opposite the first surface portion 20. In the example shown in the drawing, the first and second surface portions 20 and 22 are flat. It goes without saying, however, that these surface portions 20 and 22 may be other than flat and may be, for example, at least partially curved or structured to produce the desired optical effects. The thickness of the light guide 2 considered, between the first and second surface portions 20 and 22, is typically comprised between 200 and 300 micrometres.

Figure 3:
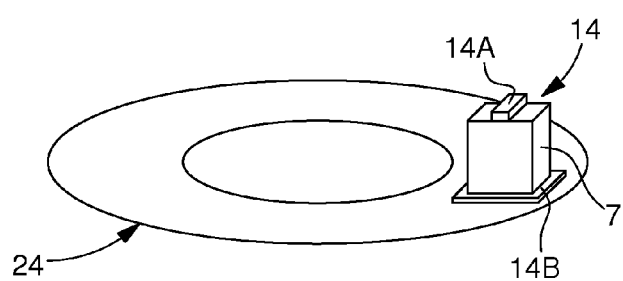
FIG. 3 is a perspective view of an electrically conductive support piece which carries the light source.

FIG. 3 is a perspective view of an electrically conductive support piece 24 which carries the light source 14. This support piece 24 has shape of a ring whose inner diameter does not encroach on hole 8 arranged in annular element 4 of light guide 2 and whose outer diameter is less than the outer diameter of annular element 4 of light guide 2. To facilitate the securing, for example by adhesive bonding, of support piece 24, a circular groove 26, in which support piece 24 is housed, may be arranged in the base of annular element 4. It will be understood that the positioning of light source 14 on support piece 24 is such that, when support piece 24 is fixed to light guide 2, light source 14 projects into housing 12 intended to accommodate said light source.

Figure 4:
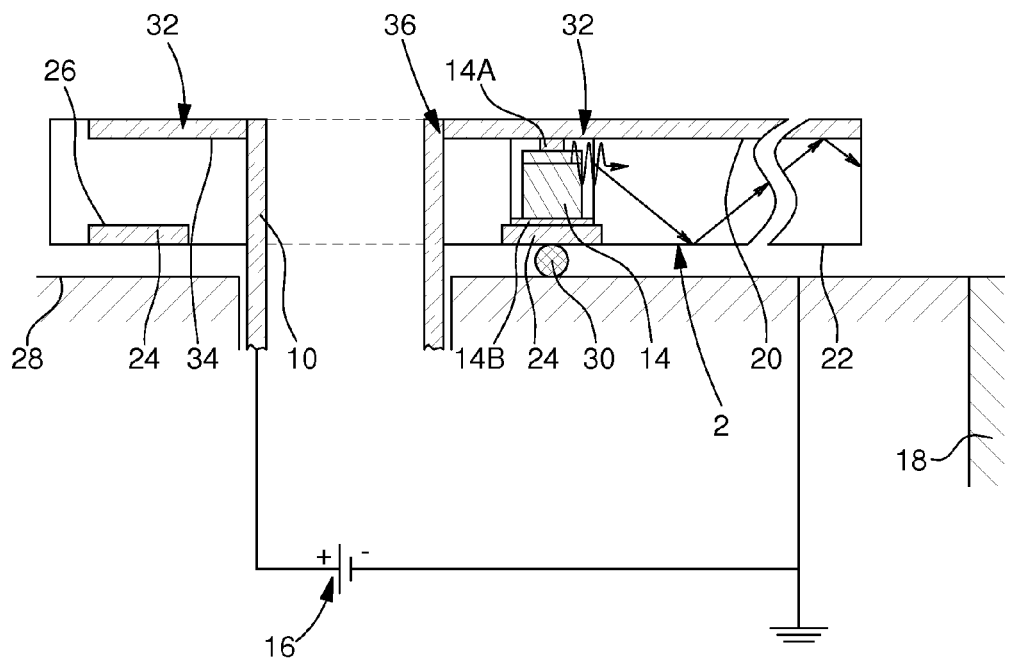
FIG. 4 is a similar view to that of FIG. 2, and shows the integration of the light source in the light guide.

FIG. 4 shows the integration of light source 14 in light guide 2. In FIG. 4, the second pole 14B of light source 14 is connected to frame 18 of the portable object and, consequently, to electrical energy supply source 16 via electrically conductive support piece 24. Purely by way of non-limiting illustration, the electrical connection between support piece 24 and an element of the portable object frame 18, such as a dial 28 above which the luminous display hand 1 according to the invention moves, occurs by means of a friction part 30. This friction part 30 will preferably be positioned as close as possible to drive arbor 10, so as to minimise the effects of friction on the rotation of luminous display hand 1. First pole 14A of light source 14 is connected to energy supply source 16 via an electrically conductive external part 32, arranged on first surface portion 20 of light guide 2, and in electrical contact with drive arbor 10. External part 32 thus has an electrical connector function in addition to its decorative function. In fact, the presence of external part 32 gives light guide 2 the appearance of a conventional watch hand. To facilitate the securing, for example by adhesive bonding, of external part 32, a groove 34, in which external part 32 is housed, may be arranged in first surface portion 20. Consequently, external part 32 is in electrical contact, via an edge 36, with drive arbor 10. This drive arbor 10, made either of an electrically conductive material, or externally coated with an electrically conductive material, is then connected to energy supply source 16. According to a preferred but non-limiting variant, frame 18 is connected to an earth terminal and first pole 14A of light source 14 is connected to the positive pole of energy supply source 16.

It goes without saying that this invention is not limited to the embodiments that have just been described and that various simple alterations and variants can be envisaged by those skilled in the art without departing from the scope of the invention as defined by the annexed claims.

LIST OF PARTS

Luminous display hand 1
Light guide 2

Annular element 4
Rectilinear portion 6
Hole 8
Drive arbor 10
Housing 12
Light source 14
First and second poles 14A, 14B
Power supply source 16
Frame 18
First surface portion 20
Second surface portion 22
Support piece 24
Circular groove 26
Dial 28
Friction part 30
External part 32
Groove 34
Edge 36

What is claimed is:

1. A luminous display hand for a portable object, wherein the portable object includes a frame which houses an electrical energy supply source, wherein the hand includes a light guide in which is arranged a hole for the passage of a drive arbour, and a housing for accommodating a light source that injects light into the light guide, wherein the light source includes first and second poles, wherein the first pole of the light source is connected to the energy supply source via the drive arbour of the hand, and wherein the second pole of the light source is connected to the energy supply source via the frame of the portable object.

2. The luminous display hand according to claim 1, wherein the second pole of the light source is connected to the frame of the portable object via an electrically conductive support piece that carries the light source.

3. The luminous display hand according to claim 2, wherein the electrical connection between the support piece and the frame of the portable object occurs by friction.

4. The luminous display hand according to claim 2, wherein the light guide includes a first surface portion facing an observer, and a second surface portion opposite the first surface portion, wherein an electrically conductive external part, that electrically connects the light source to the drive arbour, is arranged on the first surface portion of the light guide.

5. The luminous display hand according to claim 3, wherein the light guide includes a first surface portion facing an observer, and a second surface portion opposite the first surface portion, wherein an electrically conductive external part, that electrically connects the light source to the drive arbour, is arranged on the first surface portion of the light guide.

6. The luminous display hand according to claim 4, wherein the support piece is fixed to the second surface portion of the light guide.

7. The luminous display hand according to claim 5, wherein the support piece is fixed to the second surface portion of the light guide.

8. The luminous display hand according to claim 1, wherein the second pole of the light source is connected to ground.

* * * * *